United States Patent [19]

Hebert

[11] Patent Number: 5,886,624
[45] Date of Patent: Mar. 23, 1999

[54] METHOD FOR PROCESSING PRESSURE AND TEMPERATURE MEASUREMENTS IN A TIRE MONITORING SYSTEM

[75] Inventor: Jacques Hebert, St-Cloud, France

[73] Assignee: Compagnie General Des Etablissements Michelin-Michelin & Cie, France

[21] Appl. No.: 902,609

[22] Filed: Aug. 1, 1997

Related U.S. Application Data

[63] Continuation of Ser. No. 587,863, Jan. 11, 1996, abandoned, which is a continuation of Ser. No. 190,184, filed as PCT/FR92/00709 Jul. 20, 1992, abandoned.

[30] Foreign Application Priority Data

Aug. 8, 1991 [FR] France .................................. 91 10224

[51] Int. Cl.$^6$ ..................................................... B60C 23/00

[52] U.S. Cl. .......................... 340/442; 340/449; 73/146.5; 116/34 R; 200/61.22

[58] Field of Search ....................................... 343/442, 445, 343/449; 73/146.5, 146; 116/34 R; 200/61.22, 61.25

[56] References Cited

U.S. PATENT DOCUMENTS

| | | | |
|---|---|---|---|
| 4,760,371 | 7/1988 | Don | 340/442 |
| 4,893,110 | 1/1990 | Hebert | 340/442 |
| 4,909,074 | 3/1990 | Gerresheim et al. | 73/146.4 |
| 5,140,851 | 8/1992 | Hettich et al. | 73/146.5 |
| 5,192,929 | 3/1993 | Walker et al. | 342/444 |

*Primary Examiner*—Edward Lefkowitz
*Attorney, Agent, or Firm*—Alan A. Csontos; Robert R. Reed

[57] ABSTRACT

Under-inflation of a tire caused by natural deflation is subject to specific monitoring when all of the tires are in an established temperature range.

8 Claims, 3 Drawing Sheets

METHOD FOR PROCESSING PRESSURE AND TEMPERATURE MEASUREMENTS IN A TIRE MONITORING SYSTEM

This application is a continuation of application(s) Ser. No. 08/587,863 filed on Jan. 11, 1996 now abandoned which is a Continuation of application Ser. No. 08/190,184, filed as PCT/FR92/00709 Jul. 20, 1992 now abandoned.

BACKGROUND OF THE INVENTION

1. Field of the Invention

The present invention relates to tire monitoring systems. More particularly, it concerns the use of measurements taken on the tires in view of giving one or several alarms.

1. Description of the Prior Art

The primary purpose of tire monitoring systems is to alert the driver of any anomaly which could occur to these or to one of these tires, as quickly and as reliably as possible. Among the tire operating parameters to be observed, there is certainly the inflated tire air volume. This can decrease either after a flat, or by natural deflation caused by diffusion through the tire itself, which is never completely impervious to air. Since direct measurement of the volume of air enclosed in the tire is not possible, one accesses it through pressure and temperature measurements. U.S. Pat. No. 4,703,650 describes a coding device which can be used to transmit the tire pressure and temperature from the wheel to the vehicle.

To give the driver reliable and useful information, it is desirable not to be satisfied with displaying the decoded values of the pressure and temperature measurements. Permanent consultation of these indications risks being tiresome and/or their interpretation problematic. These measurements are influenced by various disturbances such as the heat emitted by the brakes or on the contrary the cooling caused by the rim, such as the load transfers which cause slight variations of the volume of the tires, or such as the heat build-up of the tire due to its hysteretic losses.

This is why, in U.S. Pat. No. 4,893,110, a process has been proposed to use measurements based on comparisons between two or more tires which aims at being able to give an alarm in case of failure of a tire without adopting alert thresholds which differ too much from the accuracy attained by the coding/decoding device.

This processing, although quite useful, does not allow for taking account of a loss of pressure affecting all tires almost equally, which is most often the case in natural deflation of tires. It is also desirable to do additional specific processing of available measurements for observation of natural deflation.

SUMMARY OF THE INVENTION

This is why a proposal is made for a process of using signals in a tire monitoring system of a vehicle, said system providing at least a measurement of the temperature recorded for each of the tires, said system calculating an estimator of the mass of air contained in each tire, characterized in that:

- a series is established which includes the temperatures recorded at approximately the same moment at least for each tire linking the vehicle to the ground,
- the difference is calculated between the maximum temperature and the minimum temperature among the series of recorded temperatures,
- when the said difference is lower than a predetermined threshold, comparison is made, for each tire, of the estimator of the mass of air contained in the tire to a value considered as the required minimum,
- an alarm is activated if one of these estimators is lower than the said minimum value.

It therefore involves selecting a measurement of pressure taken at a moment where the pressure is the most precise. Maximum accuracy is achieved in an established temperature range, and better yet, when the vehicle is also immobile. Natural deflation of tires is a slow phenomenon. It is enough to check it periodically to have sufficient monitoring of it.

DETAILED DESCRIPTION OF THE PREFERRED EMBODIMENT

Figure 1:
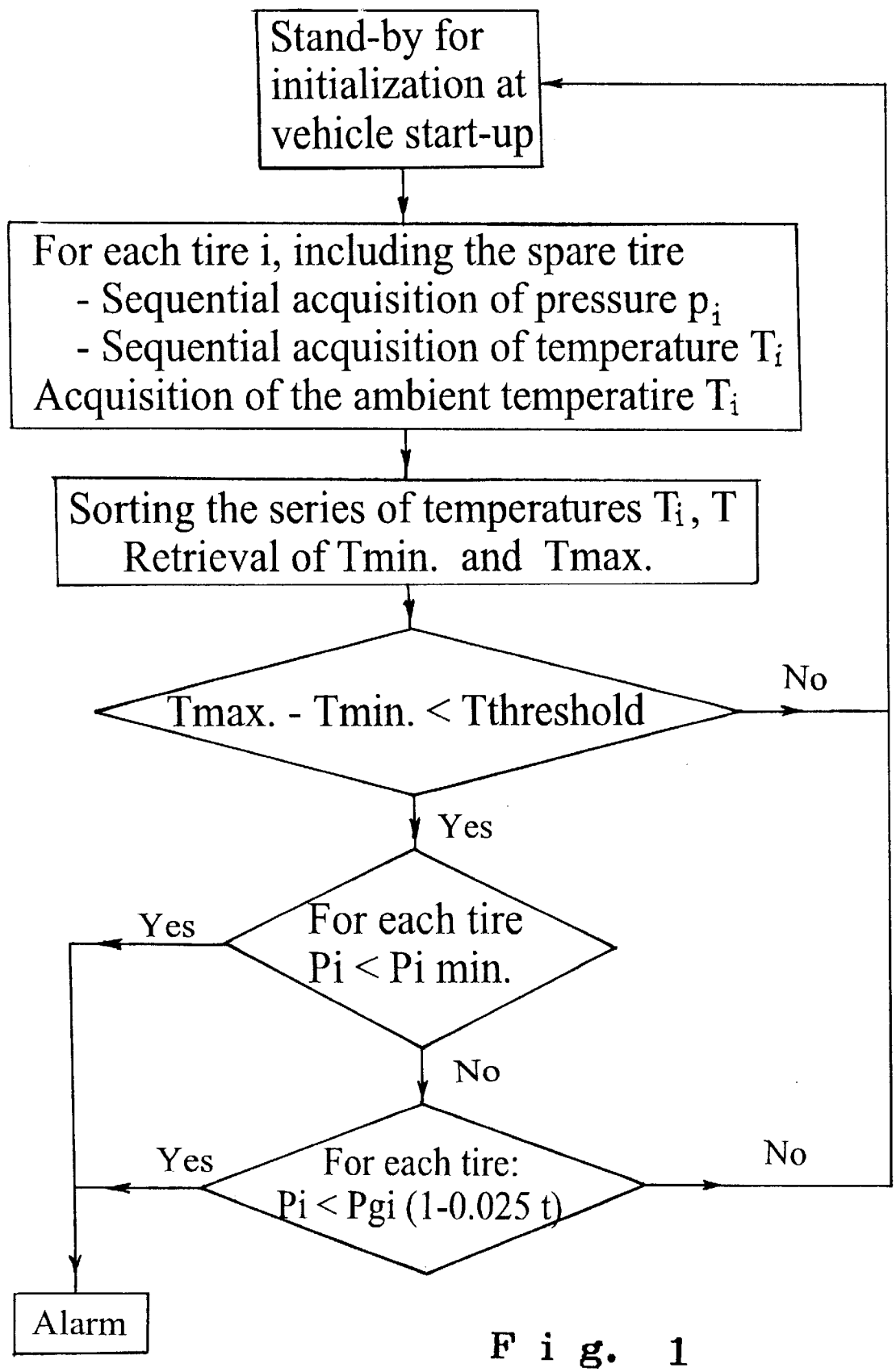
FIG. 1 is a flowchart showing the steps of one variation of the process of the present invention.

The rest of the description, with the illustration in the form of the attached flowchart (see FIG. 1), allows for good understanding of the implementation of the invention.

The experimental study has shown that, by comparing tire temperatures among themselves, a good indication of the established character of the temperature range is obtained. Also, it is preferable to proceed with checking at cold temperature rather than hot because a long period of utilization of the vehicle, at constant speed, is much less frequent than long periods of non-utilization of the vehicle. From that time on, to the criteria of noticeable equivalence of temperatures is added an additional requirement which aims at only checking under-inflation at cold temperature. Switching on can be detected at each start-up, or the temperature recorded at the same moment for the spare wheel can be incorporated into the series of temperature, or even more the temperature recorded at the same moment on one or several locations on the vehicle can be added to the said series of temperatures. For this purpose one can have for example a sensor in the decoder box of signals coming from the wheels. These various requirements can be combined, which will lead to significantly reducing the number of specific monitorings of deflation, while making them more and more reliable.

Figure 2:
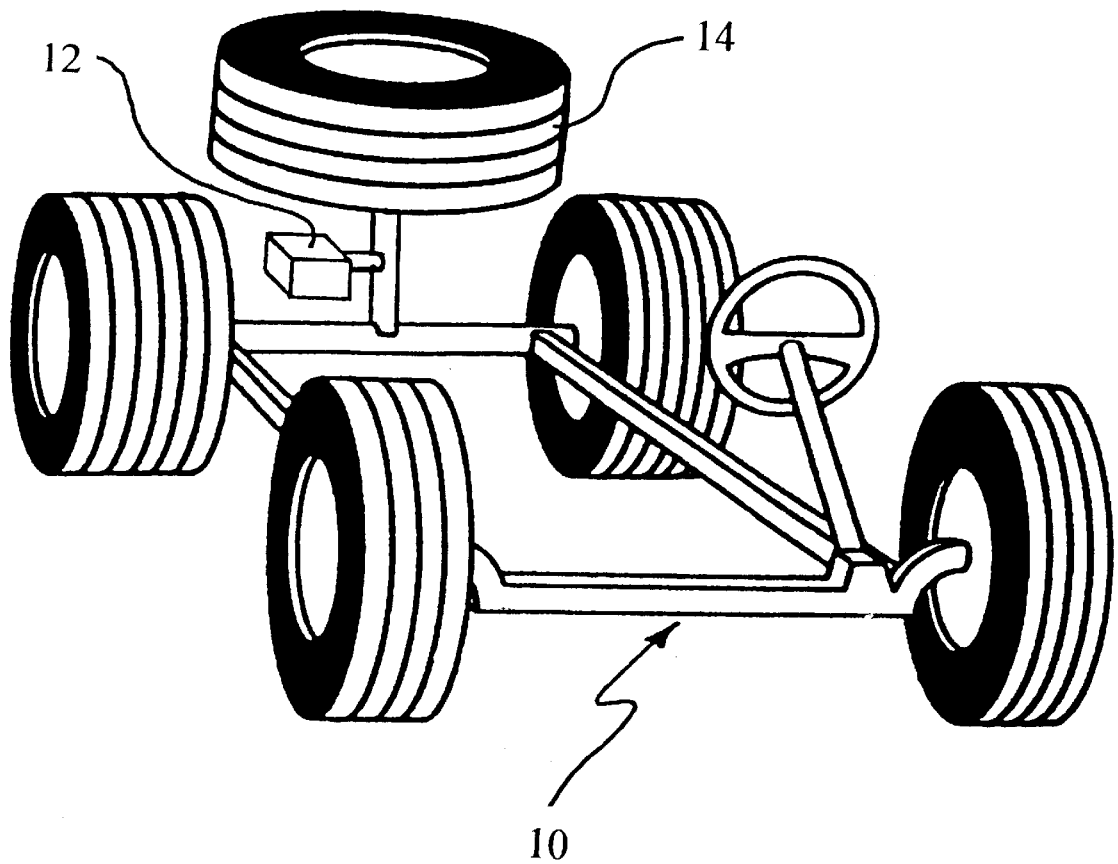
FIG. 2 is a schematic view of a vehicle having a sensor for monitoring the inflation condition of the tires of the vehicle in accordance with the process of the present invention.

As seen in FIG. 2, a vehicle 10 has a sensor 12 and a spare wheel 14. The sensor 12 monitors the temperatures of several locations of the vehicle 10.

The overall cumulative criteria therefore permits knowing if the vehicle has been stopped for a long time. Even if one does not detect all start-ups at cold temperature and in an established temperature range, enough of them are detected to arrive at a close observation of the slow phenomenon which is the natural deflation of tires. The cause of alarm which results should certainly overlap other causes of alarm which selectively locate flats, or overload, or still other causes, to procure a reliable system of tire monitoring.

As an example, for a difference of 6° C. maximum between the minimum temperature $T_{min}$ and the maximum temperature $T_{max}$ among all the temperatures recorded, an established temperature range can be concluded. This threshold obviously depends on the accuracy of the sensors.

From that time on, the volume of air inside each tire i is checked by means of the pressure measurement $p_i$, compared to the pressure $p_{i\ min}$ considered as the minimum for the tire being considered. Of course the minimum pressure can be corrected according to the temperature recorded, for example according to the ambient temperature recorded inside the vehicle if this measurement is the most accurate. In a strictly equivalent way, the quality of air can be estimated by the ratio of the absolute pressure divided by the absolute temperature. Relative to the nominal pressure, about 5% of deflation can be tolerated.

The invention also proposes comparing the residual pressure or residual air volume as measured at each start-up, to the theoretical condition of the same tire that is obtained by calculation according to the following data:

pressure $p_{gi}$ corresponding to the volume of air introduced into the tire on the day of the most recent inflation or when pressure adjustment was done, time t which has elapsed since this most recent inflation, expressed in months, rate of natural deflation considered as normal, meaning for example 2.5% per month relative to the nominal pressure, with this value including the tolerances on the measurement.

The value considered as minimal is obtained here by calculations, instead of being set at an absolute threshold. Comparison is made between $p_i$ and $p_{gi}(1-0.025\ t)$, for each tire, where t is expressed in months, and an alarm is given if $p_i$ is lower than the minimum value calculated, decreased by a predetermined threshold, which in this case should be chosen relatively low, for example 3%. It is thus possible to detect inadequate imperviousness of the tire even before the tire has reached a pressure considered as inadequate. This permits inspection and preventive maintenance, since monitoring pressure wheel by wheel uses for a threshold a value corresponding to 86% of the nominal pressure or even less, and monitoring of natural deflation uses for a threshold a value corresponding to 95% of the nominal value.

Figure 3:
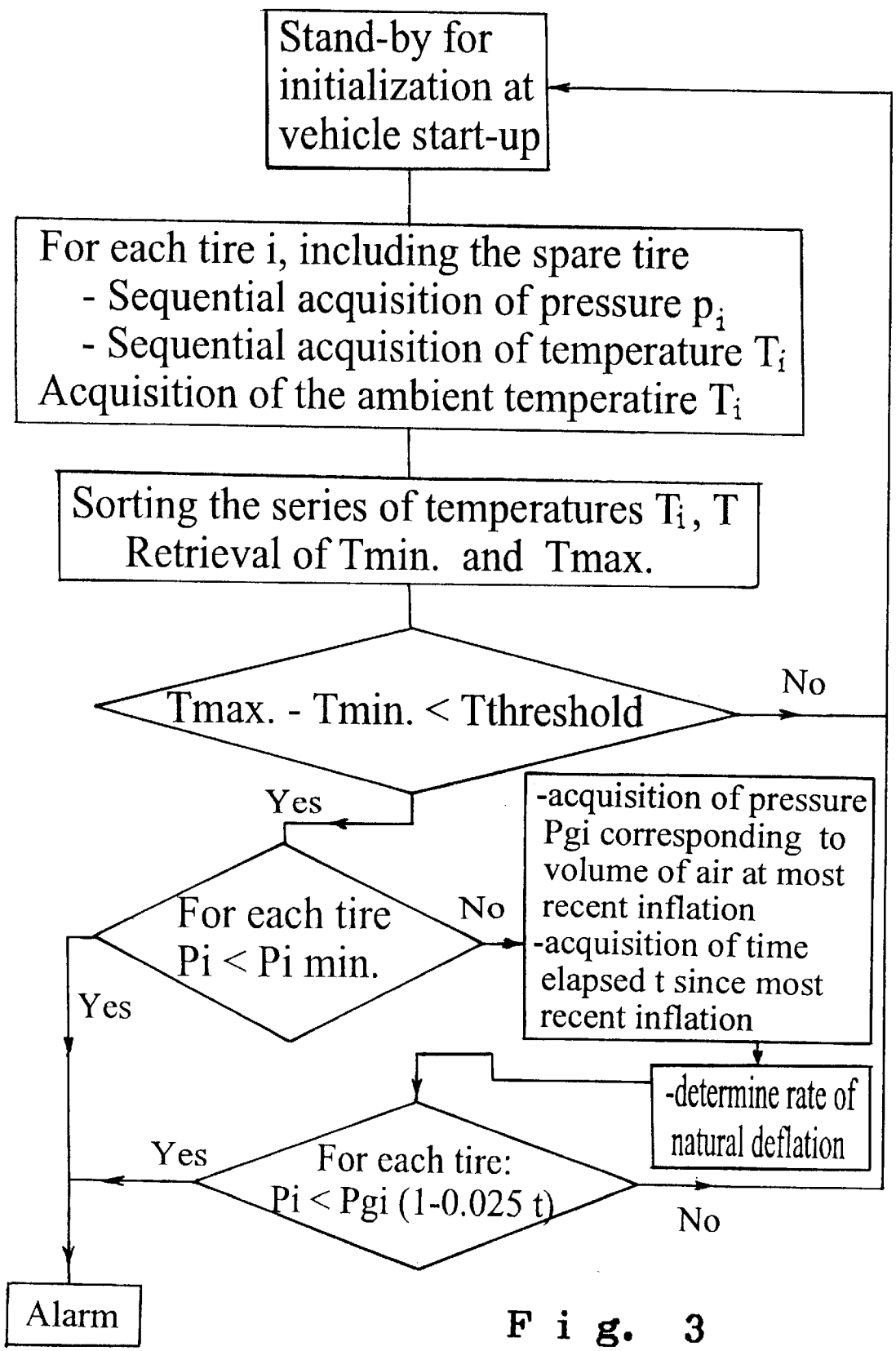
FIG. 3 is a flowchart showing the steps of another variation of the process of the present invention.

As seen in FIG. 3, an estimator $p_{abs}$ can be estimated based upon absolute pressure and absolute temperature.

In conclusion, the present invention proposes automatically checking natural deflation of tires by using certain measurements only, considered to be recorded with greater reliability, and if necessary, to check if the result obtained can be considered as corresponding to a rate of natural deflation.

A monitoring system can very advantageously incorporate several causes for alarms: natural losses, as proposed here, disequilibrium of inflation for example on one axle as proposed in U.S. Pat. No. 4,893,110, and wheel by wheel monitoring relative to a critical threshold. Such a system which monitors several criteria greatly improves overall safety.

I claim:

1. Process for monitoring a plurality of rolling tires mounted on a vehicle, each tire containing a gaseous fluid which has a mass, said plurality of tires supporting the vehicle on a surface, the process comprising:

providing for each of said plurality of tires measurement means to measure the temperature for said tires;

providing an estimator of said mass of gaseous fluid contained in said tire;

providing a series of temperatures by recording at repetitive recording times the temperatures provided by said measurement means for each of the plurality of tires;

identifying in said series of temperatures a minimum recorded temperature and a maximum recorded temperature;

calculating the difference between said minimum recorded temperature and said maximum recorded temperature;

if said difference is lower than a predetermined threshold, calculating said estimator and determining if said estimator of said mass of air of each tire is less than a minimum acceptable estimator value; and providing an indication in response to a determination that an estimator of the mass of air of a tire is less than a minimum acceptable estimator value.

2. Process of claim 1, characterized in that said required minimum value is a function of the temperature of the tire being considered.

3. Process of claim 1, characterized in that the estimator of the mass of air is composed of a ratio of an absolute pressure divided by an absolute temperature.

4. Process of claim 1, characterized in that the estimator of the mass of air is composed of a unit of the absolute pressure.

5. Process of claim 1, characterized in that said recording the temperatures is done at the time of each vehicle start-up.

6. Process of claim 1, characterized in that the temperature recorded at the same moment for a spare wheel is included in the series of temperatures recorded for each tire.

7. Process of claim 1, characterized in that to said series of temperatures, is added the temperature recorded at the same moment by a sensor located on the vehicle.

8. The process of claim 1, having means to record the day at each reinflation process for each tire, and means to monitor the time elapsed since the day of most recent reinflation of each tire and means to select accordingly a preset rate of natural deflation, wherein the amount of gaseous fluid in each tire at the time of said reinflation is recorded, and wherein said value considered as minimum is established according to said amount of gaseous fluid introduced on the day of the most recent inflation, and according to said preset rate of natural deflation.

* * * * *